(12) United States Patent
Uchida (10) Patent No.: US 8,332,814 B2
(45) Date of Patent: Dec. 11, 2012

(54) METHOD AND APPARATUS FOR CONVERTING FORMULA INCLUDED IN A COMPUTER PROGRAM

(75) Inventor: Masaru Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 985 days.

(21) Appl. No.: 11/167,766

(22) Filed: Jun. 27, 2005

(65) Prior Publication Data

US 2006/0206878 A1 Sep. 14, 2006

(30) Foreign Application Priority Data

Mar. 10, 2005 (JP) ................................. 2005-068137

(51) Int. Cl.
G06F 9/44 (2006.01)
G06F 17/24 (2006.01)
(52) U.S. Cl. .................... 717/114; 715/234; 715/239
(58) Field of Classification Search ................ 717/124
See application file for complete search history.

(56) References Cited

U.S. PATENT DOCUMENTS

| | | | | |
|---|---|---|---|---|
| 6,353,839 | B1* | 3/2002 | King et al. | 715/236 |
| 7,155,670 | B2* | 12/2006 | Takizawa et al. | 715/239 |
| 7,174,507 | B2* | 2/2007 | Baudin et al. | 715/234 |
| 7,472,346 | B2* | 12/2008 | Baelen | 715/234 |
| 7,543,224 | B2* | 6/2009 | Schwartz | 715/234 |
| 2002/0188638 | A1* | 12/2002 | Hamscher | 707/530 |
| 2005/0144166 | A1* | 6/2005 | Chapus et al. | 707/6 |
| 2005/0183002 | A1* | 8/2005 | Chapus | 715/505 |
| 2005/0197931 | A1* | 9/2005 | Gupta | 705/30 |
| 2006/0080646 | A1* | 4/2006 | Aman | 717/143 |
| 2006/0242624 | A1* | 10/2006 | Mueller-Klingspor | 717/114 |
| 2010/0031141 | A1* | 2/2010 | Summers et al. | 715/239 |

FOREIGN PATENT DOCUMENTS

| | | |
|---|---|---|
| JP | 10-63492 | 3/1998 |
| JP | 2002-169692 | 6/2002 |
| JP | 2002-366354 | 12/2002 |

OTHER PUBLICATIONS

1 Notice of Rejection with partial English translation issued in corresponding Japanese Application No. 2005-068137 on May 17, 2011.
2 Takao et al., "A Programming Language for Financial Data Written in XBRL," Technical Report of the Institute of Electronics, Information, and Communication Engineers, Japan, the Institute of Electronics, Information, and Communication Engineers, Nov. 20, 2003, vol. 103, No. 483 (KBSE2003-24) pp. 31-36.
3 Kobayashi, Shigeru, "Technology Trend for XBRL," Unisys Technology Review, Japan, Nihon Unisys, Ltd., May 31, 2004, vol. 24, No. 1, pp. 74-86.
2 Notice of Rejection with partial English translation issued in corresponding Japanese Application No. 2005-068137, dated Aug. 8, 2011.

* cited by examiner

Primary Examiner — Thuy Dao (74) Attorney, Agent, or Firm — Greer, Burns & Crain, Ltd.

(57) ABSTRACT

An apparatus, which extracts and outputs a formula included in a target program that processes an extensible-business-reporting-language (XBRL) document, includes: a variable extracting unit that extracts a variable included in the formula; an element identifying unit that identifies an XBRL element corresponding to the variable extracted, based on the XBRL document; and a label identifying unit that identifies a label corresponding to the XBRL element identified, based on the XBRL document.

12 Claims, 11 Drawing Sheets

1000

| FORMULA | SENTENCE TO BE GENERATED |
|---|---|
| A+B | A PLUS B |
| A-B | A MINUS B |
| A×B | A MULTIPLIED BY B |
| A÷B | A DIVIDED BY B |
| A=B | A EQUALS B |
| A < B | A IS SMALLER THAN B |
| A > B | A IS LARGER THAN B |
| A≦B | A IS EQUAL TO OR SMALLER THAN B |
| A≧B | A IS EQUAL TO OR LARGER THAN B |

```
<formula id=" formula1">
  <value select=" $A-$B=$C"/>
  <variable name=" A" xlink:type=" simple" xlink:href=" PL.xsd#Sales"/>
  <variable name=" B" xlink:type=" simple" xlink:href=" PL.xsd#CostOfSales"/>
  <variable name=" C" xlink:type=" simple" xlink:href=" PL.xsd#GrossProfit"/>
  <relativeResultContext relativeTo=" A"/>
</formula>
```

FIG. 3

```
<formula id=" formula2">
  <value select=" $D>=$E"/>
  <variable name=" D"xlink:type=" simple" xlink:href=" PL.xsd#Sales"/>
  <variable name=" E"xlink:type=" simple" xlink:href=" PL.xsd#Sales"
      relativeContext=" prevQuarter"/>
  <relativeContext id=" prevQuarter" relativeTo=" D">
    <period>
      <startDate monthOffset=" -3"/>
    </period>
  </relativeContext>
  <relativeResultContext relativeTo=" D"/>
</formula>
```

FIG. 4

| 401 | 402 |
|---|---|
| ELEMENT NAME | LABEL NAME |
| Sales | SALES |
| CostOfSales | COST OF SALES |
| GrossProfit | GROSS PROFIT |
| ... | ... |

| VARIABLE NAME | ELEMENT BEING REFERRED TO |
|---|---|
| A | Sales |
| B | CostOfSales |
| C | GrossProfit |

FIG. 9

| VARIABLE NAME | ELEMENT BEING REFERRED TO | CONTEXT |
|---|---|---|
| D | Sales | NONE |
| E | CostOfSales | D THREE MONTHS BEFORE |

FIG.10

| FORMULA | SENTENCE TO BE GENERATED |
|---|---|
| A+B | A PLUS B |
| A-B | A MINUS B |
| A×B | A MULTIPLIED BY B |
| A÷B | A DIVIDED BY B |
| A=B | A EQUALS B |
| A < B | A IS SMALLER THAN B |
| A > B | A IS LARGER THAN B |
| A≦B | A IS EQUAL TO OR SMALLER THAN B |
| A≧B | A IS EQUAL TO OR LARGER THAN B |

| LABEL NAME | VARIABLE |
|---|---|
| SALES | VARIABLE A |
| COST OF SALES | VARIABLE B |
| GROSS PROFIT | VARIABLE C |

| | |
|---|---|
| DESCRIPTION | SALES-COST OF SALES=GROSS PROFIT |
| COMPONENT | LABEL SALES |
| | OPERATOR - |
| | LABEL COST OF SALES |
| | OPERATOR = |
| | LABEL GROSS PROFIT |

METHOD AND APPARATUS FOR CONVERTING FORMULA INCLUDED IN A COMPUTER PROGRAM

CROSS-REFERENCE TO RELATED APPLICATIONS

This application is based upon and claims the benefit of priority from the prior Japanese Patent Application No. 2005-068137, filed on Mar. 10, 2005, the entire contents of which are incorporated herein by reference.

BACKGROUND OF THE INVENTION

1. Field of the Invention

The present invention relates to a technology for converting a formula included in a source code of a computer program so that a user can easily understand the function of the formula.

2. Description of the Related Art

Recent economic activities have been performed mainly by companies. To know the state of a company, its financial information is an important key. In public companies, it is mandatory by laws to make their financial information public. With the publicized financial information, the state of the companies can be known. Therefore, it is desired to make detailed financial information public.

One method of making financial information public by using information technology, such as the Internet, is eXtensible-Business-Reporting-Language (XBRL), which is based on eXtensible-Markup-Language (XML) and has attracted attention. The XBRL is a language for use in electronically describing, for example, a report regarding financial information, such as an income statement or balance sheet.

Application programs for managing financial information are generally used. In such application programs, for example, numerical values or the like of several items are input to a computer, and then results from computation of the input numerical values are output. However, to examine what kind of computation or process was used inside the computer for outputting the results, the contents of the application program have to be referred to.

In general, to help understand a source code described in a program language, a comment is included in the source code. The comment has a description about the process of the program. By extracting the comment included in the source code, the description about the process of the program can be obtained.

Thus, by extracting the comment included in the source code, specifications of the program can be created. Therefore, as more comments are included in the source code, specifications that are more easily understandable can be created for users.

In one conventional technology, a comment including a comment keyword can be inserted into a portion lacking in comments in a source code. The comment is extracted from the source code to create specifications (for example, refer to Japanese Patent Application Laid-Open No. 2002-169692).

In another conventional technology, program specifications and other documents can be created and, furthermore, when a change occurs in the program, the reason for the change of the program, system configuration, or information about changes in a source program due to the changed portion of the program are used to create program specification after the change (for example, refer to Japanese Patent Application Laid-Open No. 2002-366354).

However, in the conventional technologies described above, the source code is described in XBRL, which is a special program language. Therefore, a specialist conversant with financial information but not with the program language cannot understand a specific financial state from the description of the source code. As result, the financial information is practically not disclosed, and the actual management state of the company disadvantageously remains not transparent.

Furthermore, even if a specialist conversant with financial information has knowledge about XBRL to some degree, the amount of description of the source code is enormous. Therefore, it will require enormous efforts to understand specific financial state from such an enormous amount of source code, thereby making it difficult to understand the financial state.

SUMMARY OF THE INVENTION

It is an object of the present invention to at least solve the problems in the conventional technology.

An apparatus according to an aspect of the present invention, which extracts and outputs a formula included in a target program that processes an extensible-business-reporting-language document, includes: a variable extracting unit that extracts a variable included in the formula; an element identifying unit that identifies an extensible-business-reporting-language element corresponding to the variable extracted, based on the extensible-business-reporting-language document; and a label identifying unit that identifies a label corresponding to the extensible-business-reporting-language element identified, based on the extensible-business-reporting-language document.

A method according to another aspect of the present invention, which is a method of extracting and outputting a formula included in a target program that processes an extensible-business-reporting-language document, includes: extracting a variable included in the formula; identifying an extensible-business-reporting-language element corresponding to the variable extracted, based on the extensible-business-reporting-language document; and identifying a label corresponding to the extensible-business-reporting-language element identified, based on the extensible-business-reporting-language document.

A computer-readable recording medium according to still another aspect of the present invention stores a computer program to cause a computer to execute the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
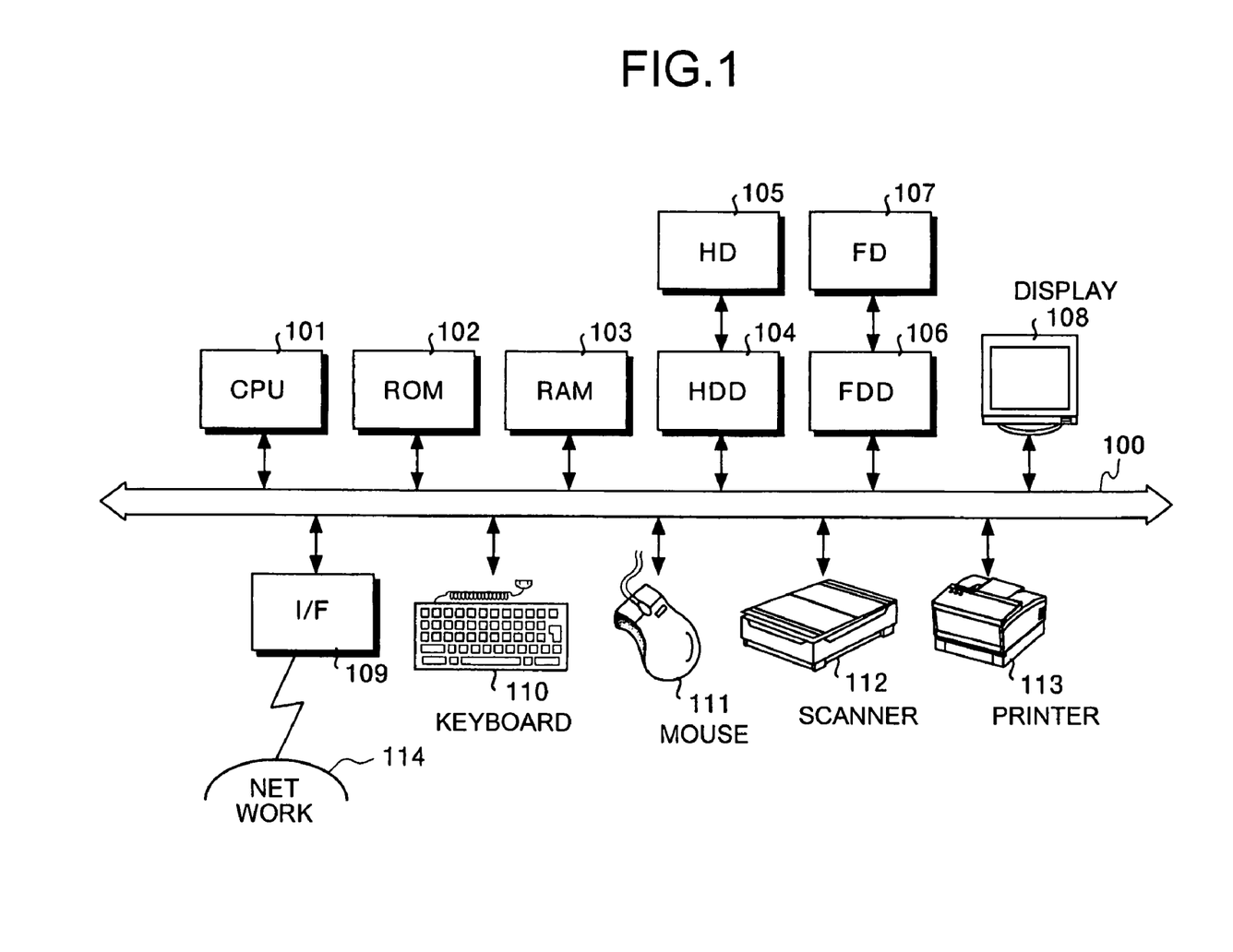
FIG. 1 is a block diagram of a hardware structure of a source-code analyzing apparatus according to first and second embodiments of the present invention.

FIG. 1 is a block diagram of a hardware structure of a source-code analyzing apparatus according to first and second embodiments of the present invention.

The source-code analyzing apparatus includes a central processing unit (CPU) 101, a read-only memory (ROM) 102, a random-access memory (RAM) 103, a hard disk drive (HDD) 104, a hard disk (HD) 105, a flexible disk drive (FDD) 106, a flexible disk (FD) 107, which is one example of a removable recording medium, a display 108, an interface (I/F) 109, a keyboard 110, a mouse 111, a scanner 112, and a printer 113. The respective components are connected to one another via a bus 100.

The CPU 101 controls the entire source-code analyzing apparatus. The ROM 102 has recorded thereon a program, such as a boot program. The RAM 103 is used as a work area by the CPU 101. The HDD 104 controls either one or both of read on and write from the HD 105 under the control of the CPU 101. The HD 105 has stored therein data written under the control of the HDD 104.

The FDD 106 controls either one or both of read on and write from the FD 107 under the control of the CPU 101. The FD 107 causes data written under the control of the FDD 106 to be stored or causes the data stored in the FD 107 to be read by the source-code analyzing apparatus.

As a removable recording medium, in addition to the FD 107, a compact disc read-only memory (CD-ROM), such as compact disc-recordable (CD-R) and compact disc rewritable (CD-RW), magneto-optical (MO) disk, digital versatile disk (DVD), and memory card may be used, for example. The display 108 displays data, such as documents, images, functional information including a cursor, icon, or tool box. As the display 108, a cathode-ray tube (CRT), thin-film transistor (TFT) liquid crystal display, or plasma display can be adopted, for example.

The I/F 109 is connected to a network 114, such as the Internet, via a communication line, and is also connected via the network 114 to another apparatus. The I/F 109 serves as an interface between the network 114 and the inside of the apparatus, and controls data inputs to and outputs from an external apparatus. As the I/F 109, a modem or local-area network (LAN) adaptor can be adopted, for example.

The keyboard 110 includes keys for inputs of characters, numbers, various instructions, etc., for data inputs, and may be an input pad of a touch panel type or ten keys, for example. The mouse 111 is used to cause a curse to be moved, an area to be selected, or a window to be moved or changed in size, for example. The mouse 111 may be arbitrary, such as a track ball or joystick, as long as it has a function as a pointing device.

The scanner 112 optically reads an image, and captures image data into the source-code analyzing apparatus. The scanner 112 may have an optical character recognition (OCR) function. The printer 113 prints image data and document data. As the printer 113, a laser printer or ink jet printer may be adopted.

Figure 2:
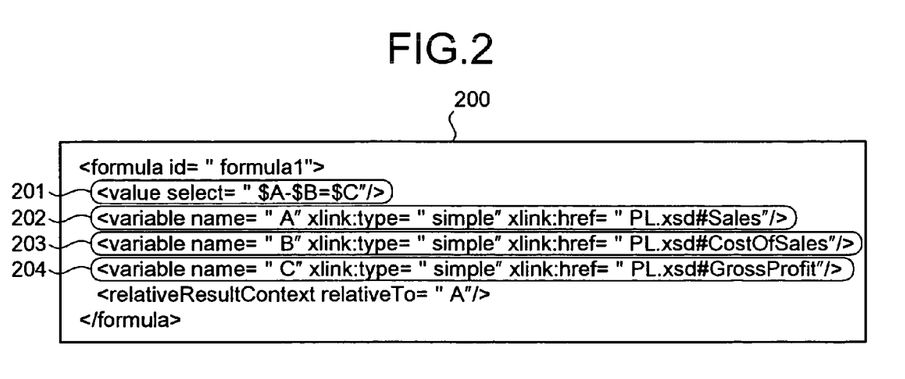
FIG. 2 is a diagram of a source code to be analyzed by the source-code analyzing apparatus according to the first embodiment.

FIG. 2 is a diagram of a source code to be analyzed by the source-code analyzing apparatus according to the first embodiment. A source code 200 is a software program described by using a program language, such as C language or Java (registered trademark).

A row denoted by a reference numeral 201 in the source code 200 describes a formula. Specifically, for example, a formula "$A-$B=$C" is calculated with the program is shown. The formula is described according to the specifications called Formula Linkbase, in which a formula is represented by an equation using variables. Furthermore, in rows denoted by reference numerals 202 to 204 in the drawing, variables for each formula and element names defining these variables are described.

Specifically, for example, the row 202 includes a variable "A" and an element name "Sales" defining the variable "A". The row 203 includes a variable "B" and an element name "CostOfSales" defining the variable "B". Furthermore, the row 204 includes a variable "C" and an element name "GrossProfit" defining the variable "C". These element names correspond in meaning to names (label names) through taxonomy, which will be described further below.

Figure 3:
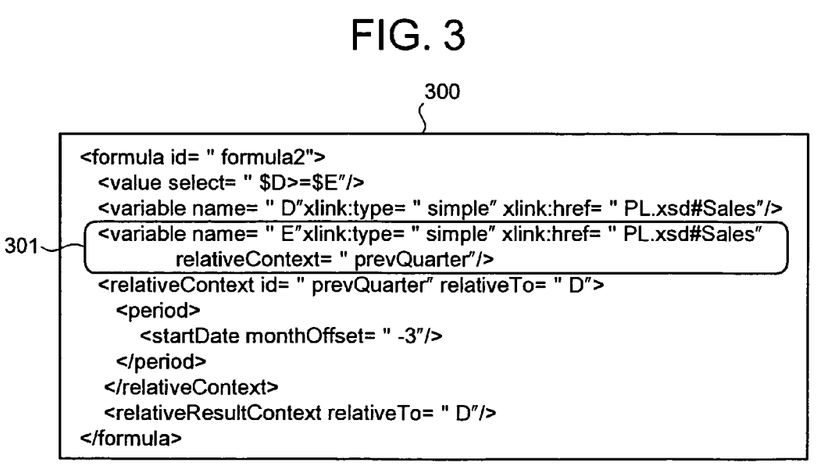
FIG. 3 is a diagram of another source code including a context to be analyzed by the source-code analyzing apparatus according to the first embodiment.

FIG. 3 is a diagram of another source code including a context to be analyzed by the source-code analyzing apparatus according to the first embodiment. A formula, variables and element names in a source code 300 are similar to those described above, and therefore are not described herein to avoid redundancy. A row denoted by a reference numeral 301 describes a variable "E" and context limitation information of specified for the variable "E". When the variable is converted to a label name, the context limitation information is converted as being added to the label name.

Figure 4:
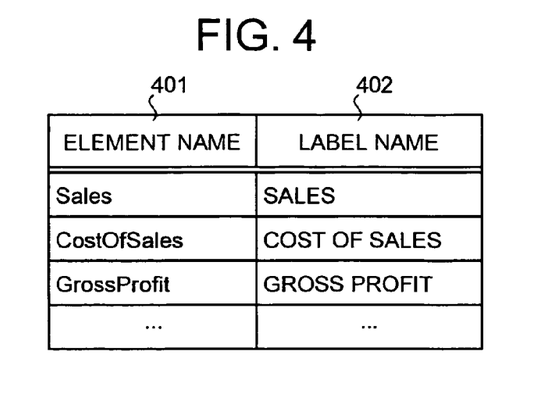
FIG. 4 is a diagram of a taxonomy defining items included in financial information according to the first embodiment.

FIG. 4 is a diagram of a taxonomy defining items included in financial information according to the first embodiment. The taxonomy generally is "a classification scheme", but in the specification, defines items and structure of a document described with the specifications called XBRL.

Items are information to be calculated, such as "sales" or "gross profit". FIG. 4 depicts names (label names) 402 corresponding to element names 401 included in a source code. Specifically, for example, for an element name "Sales", a name (label name) "sales" is defined. The name (label name) in FIG. 4 may be described in an arbitrary language.

Figure 5:
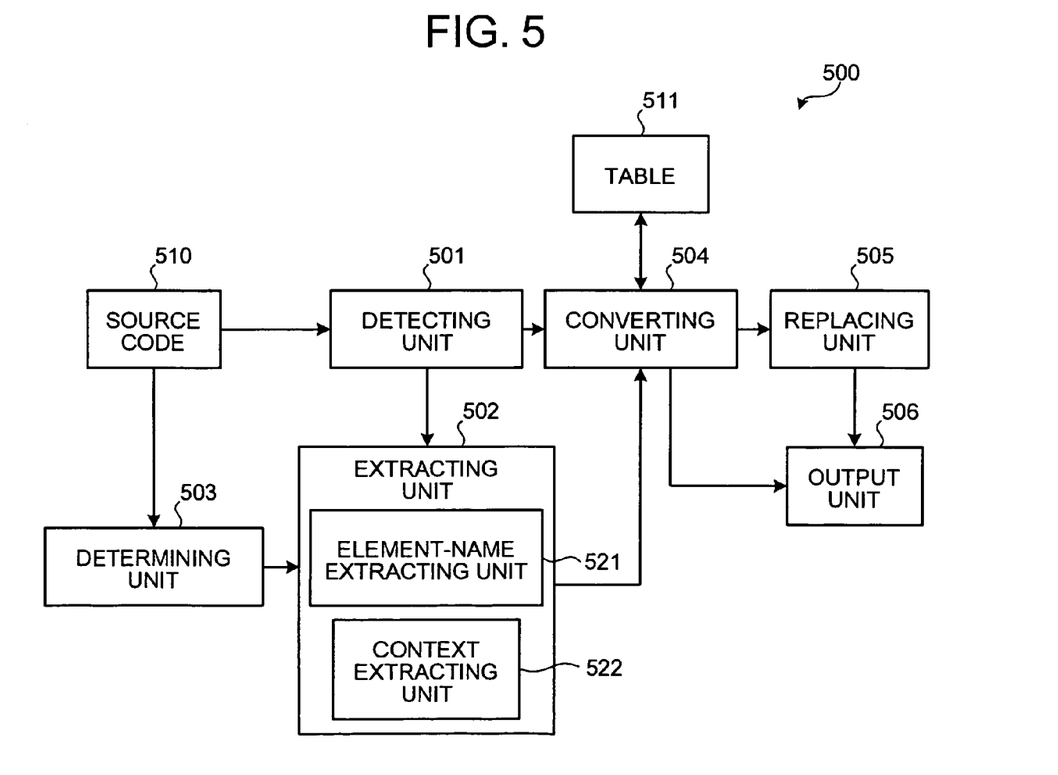
FIG. 5 is a functional block diagram of the source-code analyzing apparatus according to the first embodiment.

FIG. 5 is a functional block diagram of the source-code analyzing apparatus according to the first embodiment. A source-code analyzing apparatus 500 includes a detecting unit 501, an extracting unit 502, a determining unit 503, a converting unit 504, a replacing unit 505, and an output unit 506. The extracting unit 502 includes an element-name extracting unit 521 and a context extracting unit 522. The source-code analyzing apparatus 500 includes a source code 510 and a table 511. The source code 510 may be the source code 200 or the source code 300 described above.

The detecting unit 501 detects, in a formula described in the source code 510, variables and operators forming the formula. The operators are signs for an arithmetic operation in the formula and, specifically correspond to, for example, "+", "−", "×", "÷", "=", and "≦".

Figure 6:
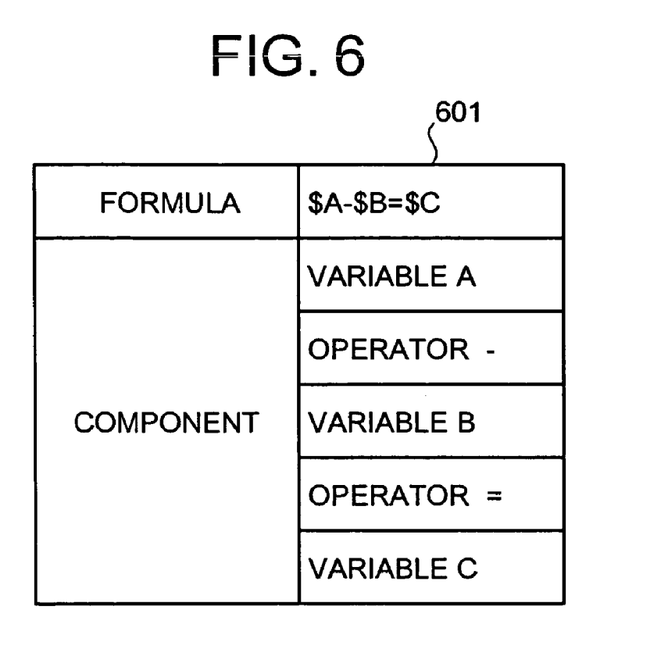
FIG. 6 is a diagram of variables and operators detected from the source code shown in FIG. 2.

Results obtained by detecting variables and operators from the source code 200 are described. FIG. 6 is a diagram of variables and operators detected from the source code 200 shown in FIG. 2. A formula 601 is detected in the formula described in the source code 200 shown in FIG. 2, and then variables and elements forming the formula 601 are detected. Specifically, for example, a variable "A", an operator "−", a variable "B", an operator "=", and a variable "C" are detected in the formula 601.

Figure 7:
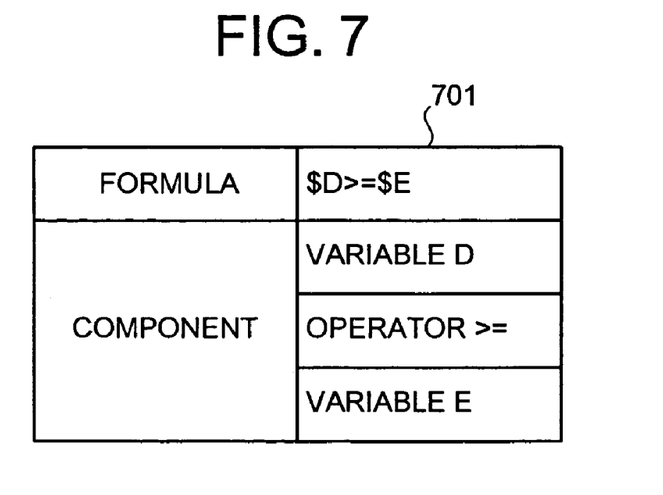
FIG. 7 is a diagram of variables and operators detected from the source code shown in FIG. 3.

FIG. 7 is a diagram of variables and operators detected from the source code 300 shown in FIG. 3. Variables and elements forming a formula 701 are detected. Specifically, for example, a variable "D", an operator ">=(≧)" and a variable "E" are detected in the formula 701.

The detecting unit 501 shown in FIG. 5 can detect a portion where operators between arbitrary two variables are all identical to one another. For example, a formula "A+B+C−D×E−F+G+H=I" is used for description. The formula includes nine variables of alphabetical characters A to I, which are divided into a left side and a right side by "=" When no operator is provided to a variable, the variable is regarded as having an operator (sign) "+". Specifically, the variables "A" and "I" each have an operator (sign) "+".

Furthermore, determination in this case is made also in consideration of an operator (sign) provided to a variable at the head of a portion where operators between arbitrary two variables are all identical to one another. Specifically, for example, on the left side including the alphabetical letters A to H, operators between two variables A and C and operators between two variables F and H all represent "+". Since the sign of the variable "A" is "+", the portion between the variables A and C corresponds to the portion.

Since the operator of the variable "F" is "−", the portion between the variables F to H does not correspond to "a portion where operators between arbitrary two variables are all identical to one another". Specifically, the detecting unit 501 achieves its function by causing the CPU 101 to execute a program recorded on a recording medium, such as the ROM 102, the RAM 103, the HD 105, and the FD 107 shown in FIG. 1.

Figure 8:
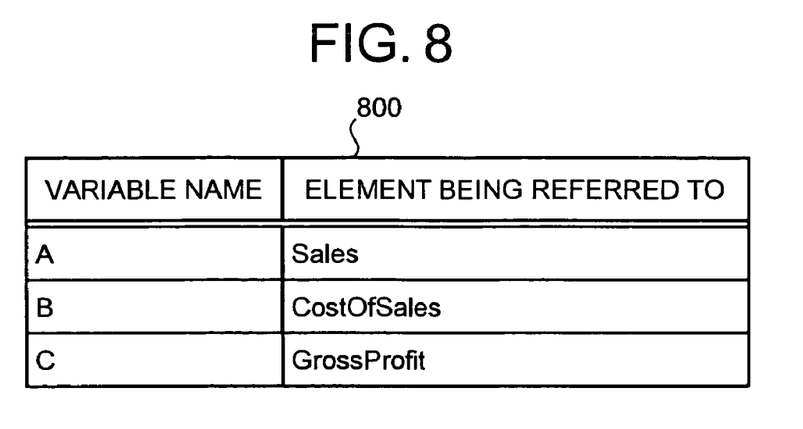
FIG. 8 is a diagram of a result of extraction performed by an element-name extracting unit.

The element-name extracting unit 521 extracts, from the source code 510, element names defining the variables detected by the detecting unit 501. Extraction results by the element-name extracting unit 521 are described. FIG. 8 is a diagram of a result of extraction performed by an element-name extracting unit. A table 800 of the extraction results shown in FIG. 8 represents the results of extracting element names from the source code 510 not including a context. Specifically, for example, the variable "A" and an element name "Sales" defining the variable "A", the variable "B" and an element name "CostOfSales" defining the variable "B", and the variable "C" and an element name "GrossProfit" defining the variable "C" are extracted.

The determining unit 503 determines whether a context regarding any of the element names extracted by the element-name extracting unit 521 is described in the source code 510. Specifically, for example, when the source code 300 shown in FIG. 3 includes "relativeContext=" shown in the row 301, it is determined that a context regarding the any of the element names is included.

The context extracting unit 522 extracts, from the source code 510, the context regarding any of the element names extracted by the element-name extracting unit 521. The context extracting unit 522 extracts the context regarding the element name extracted by the element-name extracting unit 521 from the source code 510 based on the determination result by the determining unit 503.

Specifically, for example, in the row 301 shown in the source code 300 of FIG. 3, the context regarding the element name "Sales" defining the variable "E" is extracted. Specifically, for example, such a context extracting function is achieved by causing the CPU 101 to execute a program recorded on a recording medium, such as the ROM 102, the RAM 103, the HD 105, and the FD 107 shown in FIG. 1.

Figure 9:
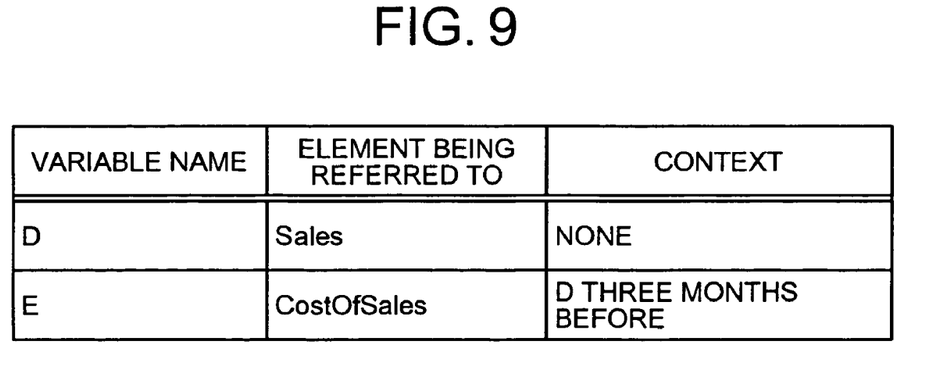
FIG. 9 is a diagram of element names and a context extracted from the source code.

Results of extracting the element names and the context from the source code 510 including the context are shown. FIG. 9 is a diagram of element names and a context extracted from the source code 510. When the source code 510 includes a context, the context is also extracted. Specifically, for example, the element name "Sales" defining the variable "D", the element name "Sales" defining the variable "E", and the context concerning the variable "E" shown in FIG. 3 are extracted. The context includes information indicative of "three months before D".

Referring back to FIG. 5, the converting unit 504 converts the element name extracted by the element-name extracting unit 521 into a name corresponding in meaning to the element name in a predetermined language. The name corresponding in meaning to the element name is a name (label name) corresponding to the element name described in the table 511. Specifically, for example, the element name "Sales" in FIG. 4 refers to a name (label name) "sales".

The converting unit 504 converts the context extracted by the context extracting unit 522 into an element name and a name corresponding in meaning to the context in a predetermined language. When a context is included, a "name" corresponding in meaning to the context is provided before or after the variable specified by the context and the "name" corresponding in meaning to the element name.

Specifically, for example, in the case where a name representing the element name defining an arbitrary variable is "sales" and a context is specified for the arbitrary variable, if a name represented by the context is "three months before", "three months before" is added after "sales" to result in "sales three months before".

Figure 10:
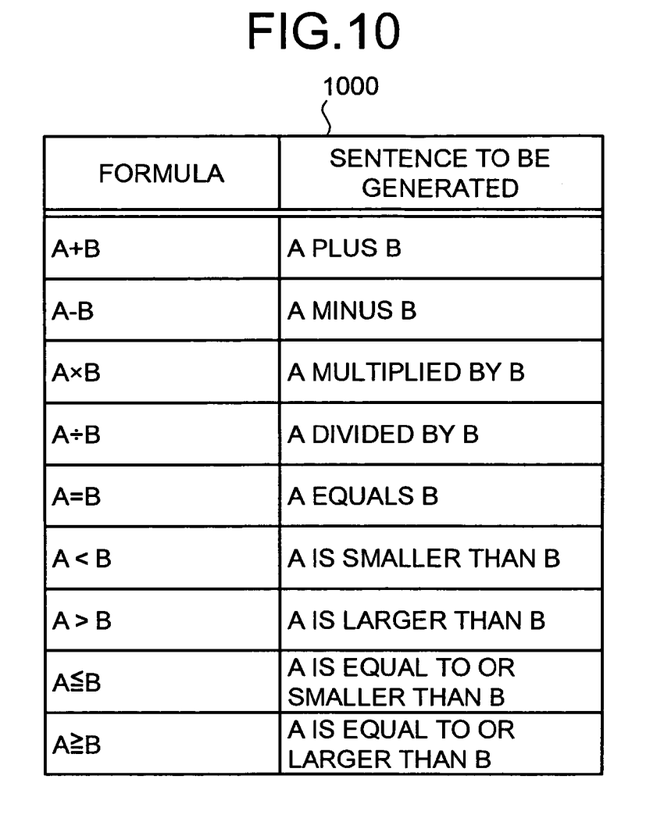
FIG. 10 is a diagram of a relation between a formula and a sentence to be generated.

The converting unit 504 converts the operator detected by the detecting unit 501 to a term corresponding in meaning to the operator in a predetermined language. A term corresponding in meaning to an operator is described. FIG. 10 is a diagram of a relation between a formula and a sentence to be generated. Conversion is performed by referring to a table 1000 shown in FIG. 10.

Specifically, for example, "A+B" is converted to "A plus B". When an operator is converted to a sentence, as to conversion of the four fundamental operations of arithmetic, the formula itself may be converted to a sentence with reference to the table as described above, or only the operator may be converted, such as from conversion of "+" to "plus". In either case, the same result can be obtained.

Figure 11:
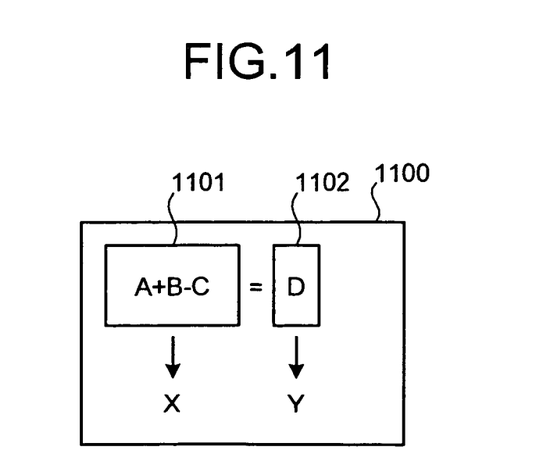
FIG. 11 is a diagram for explaining how an equal-sign is converted.

A scheme of converting an equal sign "=" or an inequality sign (for example, "≦") is described next. FIG. 11 is a diagram for explaining how an equal-sign is converted. A formula 1100 includes variables "A", "B", "C" and "C" and operators "+", "−", and "=". When the formula includes an equal sign as in the formula 1100, the formula 1100 is first divided into a left side 1101 and a right side 1102. For convenience of description, it is assumed herein that the left side 1101 is represented by "X" and the right side 1102 is represented by "Y", thereby X=Y.

The left side (X) 1101 is analyzed to generate a sentence by replacing operators on the left side (X) 1101 of the formula by terms corresponding in meaning to the operators. Specifically, for example, a sentence "A plus B minus C" is generated from the left side (X). Next, the right side (Y) is analyzed. Since the right side (Y) includes only the variable "D", no sentence is generated.

After sentence generation is performed on both sides, conversion of the generated sentence is next performed. First, with reference to the table of FIG. 10, X=Y is converted to "X equals Y". Then, the sentences generated on the left side (X) 1101 and the right side (Y) 1102 are replaced. Specifically for example, replacement is performed to generate a sentence "A plus B minus C equals D". The scheme is descried by taking an equal-sign converting scheme as an example. However, a formula including an inequality sign can also be converted through a scheme similar to the scheme described above.

The converting unit 504 converts a portion of the formula where operators between arbitrary two variables are all identical to one another detected by the detecting unit 501 to a sentence corresponding in meaning to the formula described in that portion in a predetermined language.

Figure 12:
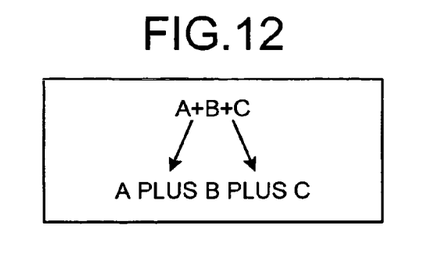
FIGS. 12 and 13 are diagrams for explaining how a portion, in which operators between arbitrary two variables are all identical to one another, is converted to a sentence corresponding the meaning of the formula.
Figure 13:
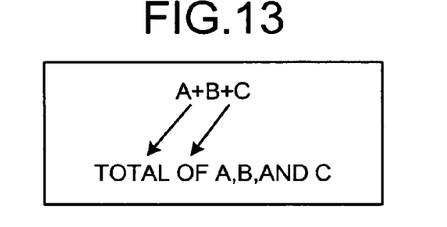

A scheme of converting a portion where operators between arbitrary two variables are all identical to one another to a sentence corresponding in meaning to the formula is described next. FIGS. 12 and 13 are drawings of one example of a scheme of converting a portion where operators between arbitrary two variables are all identical to one another to a sentence corresponding in meaning to the formula. "A portion where operators between arbitrary two variables are all identical to one another" corresponds to "A+B+C" described above. When the portion is converted by using the table of FIG. 10, as shown in FIG. 12, "+" is converted to "plus", resulting in "A plus B plus C".

Such consecutive three or more additions can be converted to a representation "a total of A, B, and C". In such a scheme, specifically, for example, "+" included in the formula is converted to a character "and", and then "a total of" is added before the first variable (item).

Referring back to FIG. 5, the predetermined language is an arbitrary language defined correspondingly to the element name through the table. Specifically, for example, the converting unit 504 achieves its function by causing the CPU 101 to execute a program recorded on a recording medium, such as the ROM 102, the RAM 103, the HD 105, and the FD 107 shown in FIG. 1.

The replacing unit 505 replaces the variable forming the formula by the name obtained through conversion by the converting unit 504 from the element name defined by the variable. Specifically, for example, when a formula "$A−$B=$C" is described using variables and then the variable A is converted to "sales", the variable B is converted to "cost of sales", and the variable C is converted to "gross profit", the replacement result is "sales-cost of sales=gross profit".

The output unit 506 outputs the names obtained through conversion by the converting unit 504. The output unit 506 outputs the names obtained through conversion by the converting unit 504 by associating these names with variables defined by the element names, which are conversion sources of the names. Furthermore, the output unit 506 outputs the formula obtained through replacement to names by the replacing unit 505. The output names, variables, and formula may be displayed on the display 108 shown in FIG. 1, or may be output as sound. Specifically, for example, the output unit 506 achieves its function by causing the CPU 101 to execute a program recorded on a recording medium, such as the ROM 102, the RAM 103, the HD 105, and the FD 107 shown in FIG. 1.

Figure 14:
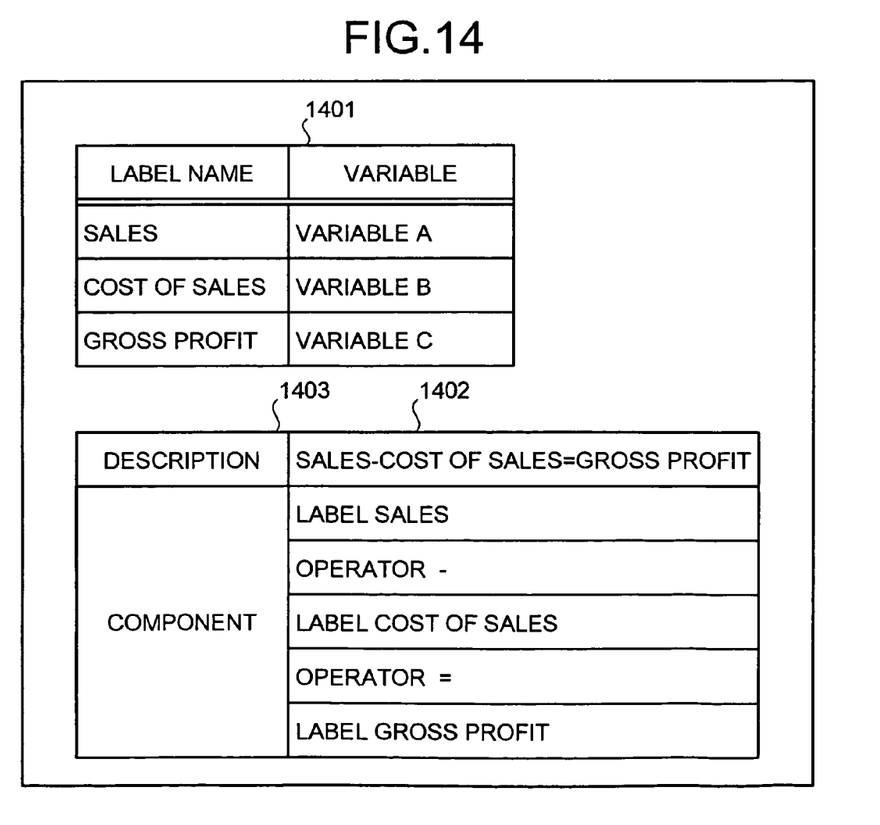
FIG. 14 is a diagram for explaining how a source code is modified when a formula is changed.

Description is made to an example of changing a source code based on the label name described above and the information about the variable corresponding to the label name when a formula in the source code is changed. FIG. 14 is a diagram for explaining how a source code is modified when a formula is changed.

A table 1401 depicts a relation between the label name and the variable corresponding to the label name. A table 1402 depicts a relation between description 1403 and components of the description 1403. Description is exemplarily made to the case where the label name "sales" of the description 1403 is changed to a character string "cost of sales".

When the label name "sales" is changed to the character string "cost of sales", it is evident with reference to the taxonomy shown in FIG. 4 that the label name "cost of sales" corresponds to the element name "CostOfSales". It is evident from the table 1401 that the label name "sales" corresponds to the variable "A". Therefore, the element name "Sales" defining the variable A is converted to the element name "CostOfSales".

Figure 15:
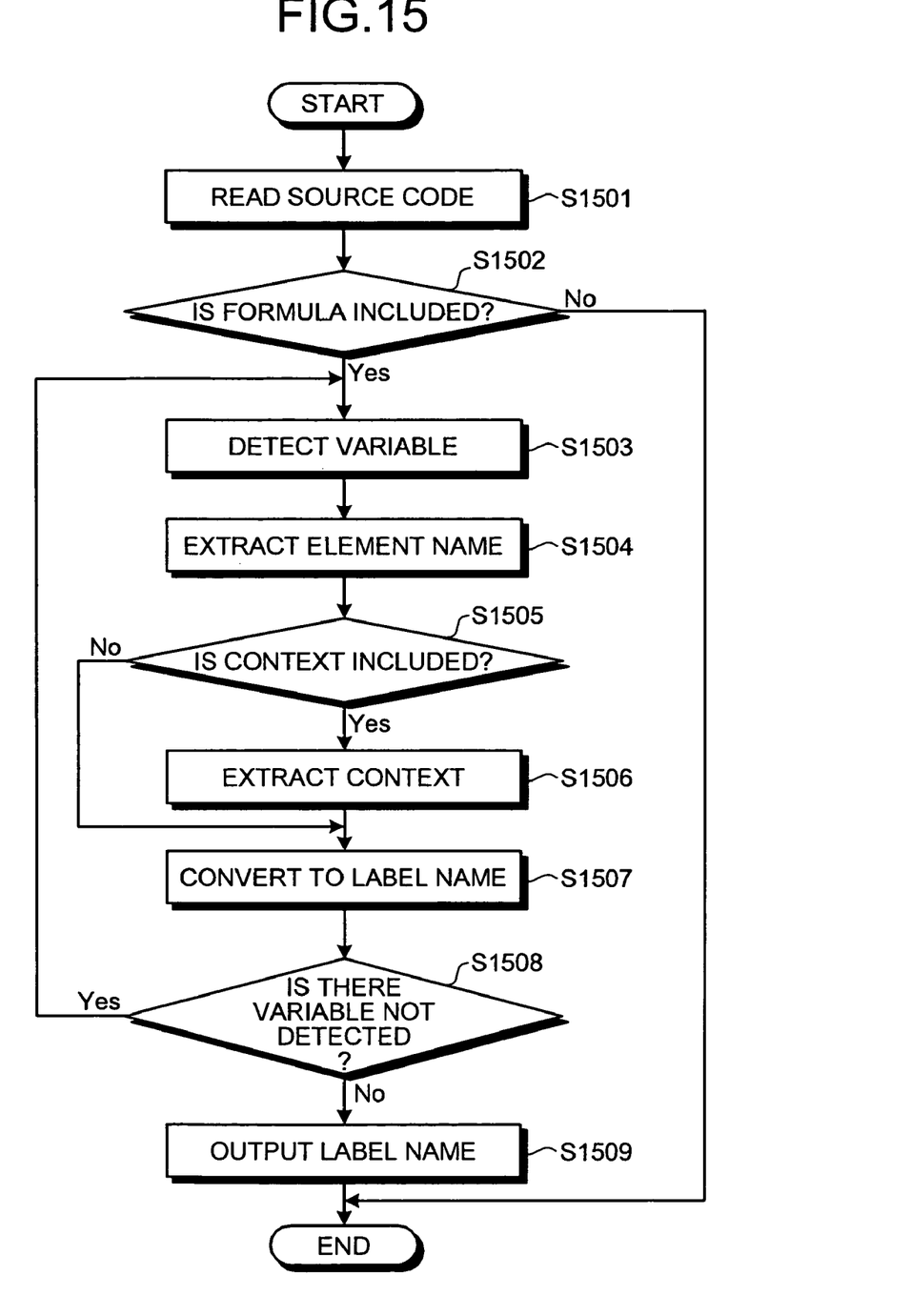
FIGS. 15 and 16 are flowcharts of a source-code analyzing process according to the first embodiment.

FIG. 15 is a flowchart of a source-code analyzing process according to the first embodiment.

The source code 510 is read (step S1501), and it is determined whether the source code 510 includes a formula (step S1502). If the source code 510 does not include any formula ("NO" at step S1502), since no subject to be converted is included in the source code 510, a series of processes ends. On the other hand, if the source code 510 includes a formula ("YES" at step S1502), a variable included in the source code 510 is detected (step S1503).

The element name defining the variable detected at step S1503 is extracted from the source code 510 (step S1504). It is then determined whether the element name includes a context (step S1505). If no context is included ("NO" at step S1505), the procedure goes to step S1507. On the other hand, if a context is included ("YES" at step S1505), the context included in the element name is extracted from the source code (step S1506).

The element name and the context extracted at steps S1504 and S1506 are converted to names corresponding in meaning to the element name and the context (step S1507). It is then determined whether there is any variable not detected (step S1508). If there is such a variable ("YES" at step S1508), the procedure goes to step S1503 to detect the variable. If there is not such a variable ("NO" at step S1508), the name obtained through conversion at step S1507 is output (step S1509), then the series of process ends.

According to the source-code analyzing process shown in FIG. 15, a variable in a formula described in the source code can be converted to a predetermined language. As a result, the source code can be easily understood in a simple manner.

Figure 16:
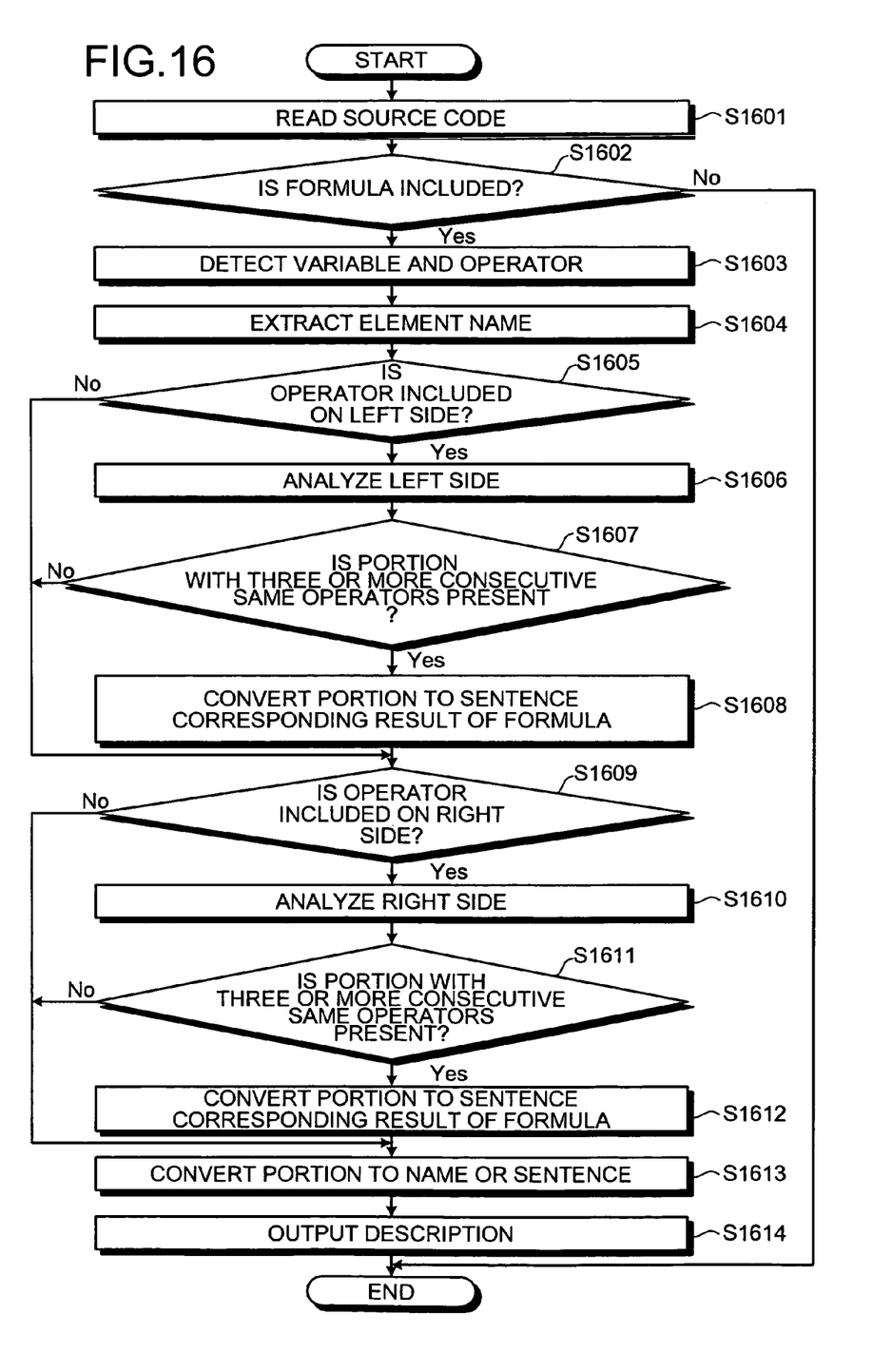

FIG. 16 is another flowchart of the source-code analyzing process according to the first embodiment. In the source-code analyzing process shown in FIG. 15, the element name and the context are converted. In the source-code analyzing process shown in FIG. 16, the element name, the context, and the operators are converted.

The source code 510 is read (step S1601), and it is determined whether the source code 510 includes a formula (step S1602). If the source code 510 does not include any formula ("NO" at step S1602), since no subject to be converted is present, a series of processes ends. On the other hand, if the source code 510 includes a formula ("YES" at step S1602), a variable and an operator included in the source code 510 are detected (step S1603).

Based on the variable and the operator detected at step S1603, the element name defining the variable is extracted (step S1604). It is then determined whether an operator is included on the left side of the formula described in the source code 510 (step S1605). If no operator is included on the left side ("NO" at step S1605), the procedure goes to step S1609. On the other hand, if an operator is included ("YES" at step S1605), the left side is analyzed (step S1606).

Based on the analysis results at step S1606, it is determined whether a portion with three or more consecutive same operators is present (step S1607). If no such portion is present ("NO" at step S1607), the procedure goes to step S1609. On the other hand, if a portion with three or more consecutive same operators is present ("YES" at step S1607), the portion is converted to a sentence corresponding in meaning to the formula described in that portion (step S1608).

A process similar to that performed on the left side is performed on the right side. It is determined whether an operator is included on the right side of the formula described in the source code 510 (step S1609). If no operator is included on the left side ("NO" at step S1609), the procedure goes to step S1613. On the other hand, if an operator is included ("YES" at step S1609), the right side is analyzed (step S1610).

Based on the analysis result at step S1610, it is determined whether a portion with three or more consecutive same operators is present (step S1611). If no such portion is present ("NO" at step S1611), the procedure goes to step S1613. On the other hand, if a portion with three or more consecutive same operators is present ("YES" at step S1611), the portion is converted to a sentence corresponding in meaning to the formula described in that portion (step S1612).

The extracted element name, an operator left as not being processed at the steps described above, or the like is converted to either one of a name and a sentence corresponding in meaning to the element name or the operator (step S1613), and a description obtained through conversion is output (step S1614), then the series of processes ends.

As described above, according to the first embodiment, variables and operators included in a formula described in a source code can be converted to a predetermined language. Therefore, the source code can be easily understood in a simple manner.

In the first embodiment, variables and operators included in a formula described in a source code are described in a predetermined language. In a second embodiment, a character string describing a formula is converted to variables and operators to allow the formula to be edited. Since the hardware structure of a source-code analyzing apparatus according to the second embodiment of the present invention is similar to that according to the first embodiment, and therefore is not described herein.

Figure 17:
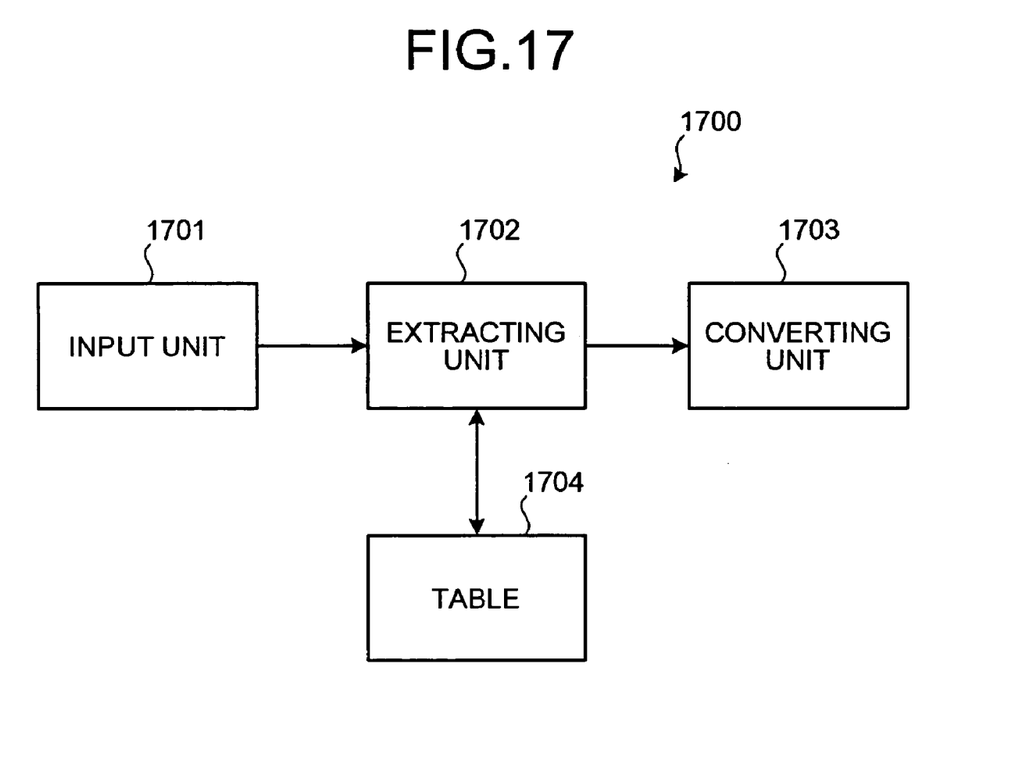
FIG. 17 is a functional block diagram of a source-code analyzing apparatus according to the second embodiment.

FIG. 17 is a functional block diagram of the source-code analyzing apparatus according to the second embodiment. A source-code analyzing apparatus 1700 includes an input unit 1701, an extracting unit 1702, and a converting unit 1703. The extracting unit 1702 refers to a table 1704.

The input unit 1701 accepts an input of a formula including a character string in a predetermined language representing an arbitrary variable defined by a source code. Specifically, with reference to the table defining the taxonomy shown in FIG. 4, a word identical to the name (label name) is extracted. For example, when a character string "sales-cost of sales=gross profit" is input, words "sales", "cost of sales", "gross profit" are extracted with reference to the table shown in FIG. 4.

The extracting unit 1702 also extracts, from the formula, a character string representing an operator in the formula in a predetermined language. If an operator is not included as it is in the input character string, a word corresponding to the operator is extracted with reference to the table 1000 shown in FIG. 10. When "sales minus cost of sales equals gross profit" is input, for example, "sales", "cost of sales", "gross profit" are extracted with reference to the table shown in FIG. 4.

Furthermore, "minus" and "equals" are extracted with reference to the table 1000 of FIG. 10. Specifically, for example, the extracting unit 1702 achieves its function by causing the CPU 101 to execute a program recorded on a recording medium, such as the ROM 102, the RAM 103, the HD 105, and the FD 107 shown in FIG. 1.

The converting unit 1703 converts the character string extracted by the extracting unit 1702 to an element name corresponding in meaning to the character string. Specifically, the converting unit 1702 converts the character string extracted by the extracting unit 1702 with reference to the table shown in FIG. 4. For example, the name (label name) "sales" extracted by the extracting unit 1702 is converted with reference to FIG. 4 to the element name "Sales" corresponding in meaning to "sales".

The converting unit 1703 further converts the character string regarding the operator extracted by the extracting unit 1702 to an operator corresponding in meaning to the character string. Specifically, for example, when single character strings, such as "minus" and "equals", corresponding to operators are extracted, "minus" is converted to the operator "−" and "equals" is converted to the operator "=" with reference to the table 1000 shown in FIG. 10. The converting unit 1703 achieves its function by causing the CPU 101 to execute a program recorded on a recording medium, such as the ROM 102, the RAM 103, the HD 105, and the FD 107 shown in FIG. 1.

Figure 18:
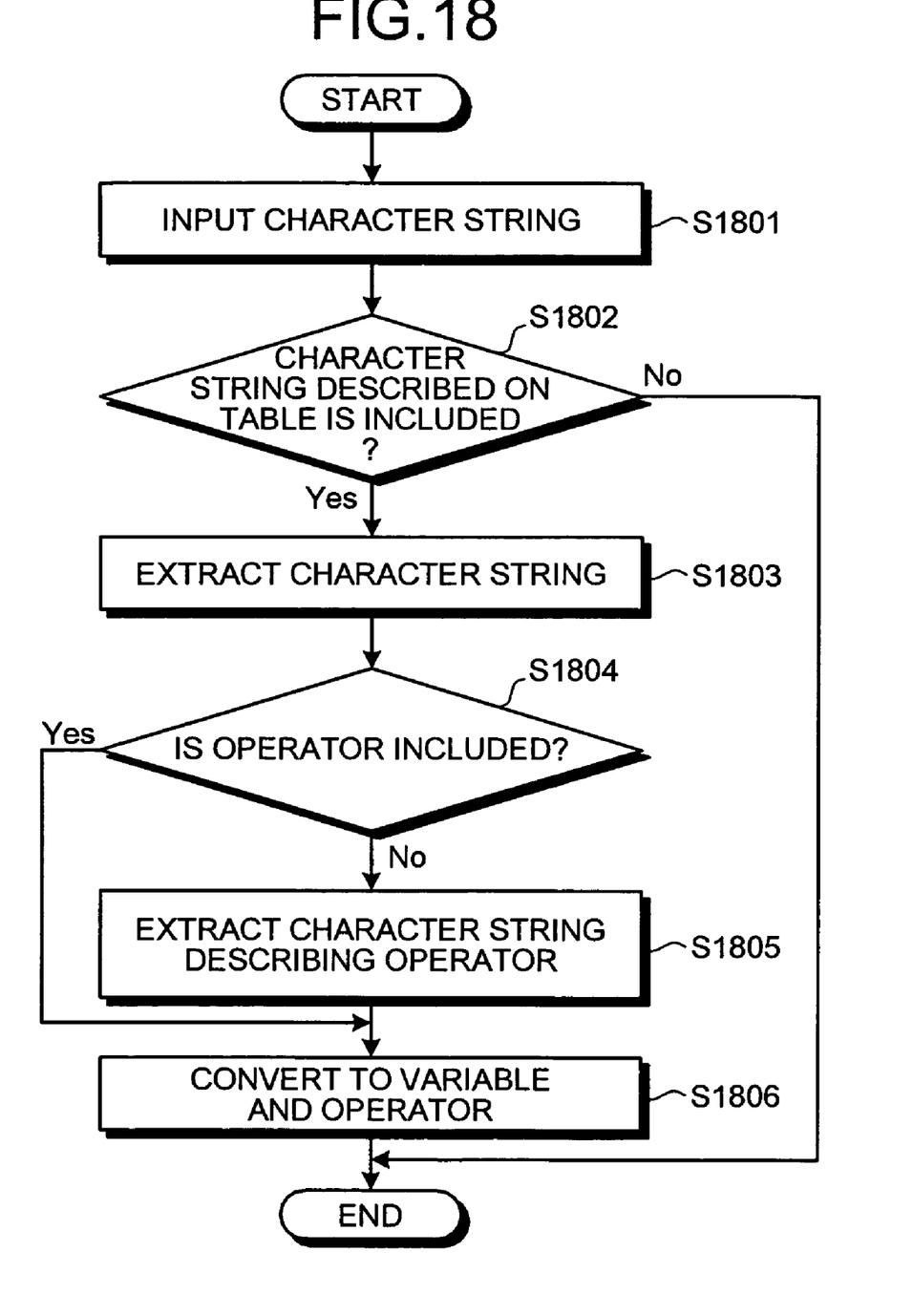
FIG. 18 is a flowchart of a source-code analyzing process according to the second embodiment.

FIG. 18 is a flowchart of a source-code analyzing process according to the second embodiment of the present invention.

An input of a character string regarding a formula is first accepted (step S1801). It is then determined whether the input character string includes a character string described on the table 1704 (step S1802). If no character string described on the table 1704 is included ("NO" at step S1802), no subject to be converted is present, and a series of processes ends. On the other hand, if a character string described on the table 1704 is included ("YES" at step S1802), the character string is extracted from the input formula (step S1803).

It is then determined whether the formula includes an operator (step S1804). If the formula includes an operator ("YES" at step S1804), the procedure goes to step S1806. On the other hand, if the formula does not include an operator ("NO" at step S1804), a character string describing the operator in a predetermined language is extracted from the character string (step S1805). The extracted character string is converted to a variable and an operator corresponding the meaning of the character string (step S1806), then the series of processes ends.

As described above, according to the second embodiment, a character string describing a formula can be converted to a variable and an operator to allow the formula to be edited. Therefore, even if the formula is changed, a change is made by using a predetermined language.

As has been described in the foregoing, according to the present invention, a formula described in the source code can be converted to a predetermined language. Thus, even a complex formula can be converted so as to be easily understood.

Furthermore, each name (label name) can be defined by using an arbitrary language, such as Japanese, English, or French. In the first and second embodiments, the element name in the source code mentioned above is described in English as a complete English word or sentence or as an abbreviation thereof. Therefore, the element name may be different from a complete English sentence or word.

Specifically, in some cases, a long label name is changed to an element name represented by a short character string having a meaning similar to that of the label name. For example, a label name "Increase in Accrued Interest Income" is described in a source code as an element name "ChangeInterestReceivable". As such, if the element name is used as it is in a formula, a problem may arise where the meaning of the element name cannot be easily understood even the element name is described in the same English language. The present invention is also useful to overcome such a problem occurring in the case where the label name is described in English.

The source-code analyzing method described in the present embodiments can be achieved by a computer, such as a personal computer or a work station, executing a program provided in advance. The program is recorded on a computer-readable recording medium, such as a hard disk, flexible disk, CD-ROM, MO disk, or DVD, and is executed by being read from the recording medium by a computer. Alternatively, the program may be a transfer medium that can be distributed via a network, such as the Internet.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for converting a formula in a source code to a human language sentence, the method, executed by a processing unit, comprising:
    extracting a first variable included in a formula from the source code described in extensible business reporting language (XBRL), the formula having at least two variables which are divided into a left side and a right side by an operator;
    assigning a predetermined operator to any variables in the formula not provided with a specific operator;
    searching the source code for a first XBRL element that defines the first variable;
    identifying a first label name corresponding to the XBRL element by searching a table that defines label names for XBRL elements, respectively;
    extracting a second variable included in the formula but in a different side of the formula from the first variable;
    searching the source code for a second XBRL element that defines the second variable;
    identifying a second label name corresponding to the second XBRL element by searching the table;
    extracting the operator included in the formula from the source code; and
    replacing the operator with a character string indicating a function of the operator, wherein the character string, the first label name, and the second label name create a human language sentence.

2. The method according to claim 1, further comprising:
    extracting, from the source code, a second character string corresponding to a context element associated with at least one of the first and second variables,
    replacing the at least one of the first and second variables with the second character string to which the label name corresponding to the at least one of the first and second variables is attached; and
    outputting the formula with the at least one of the first and second variables that is replaced with the second character string to which the label name corresponding to the at least one of the first and second variables is attached.

3. The method according to claim 2, further comprising:
    outputting the formula with the operator that is replaced with the character string.

4. The method according to claim 2, further comprising:
    extracting a sub-formula including a plurality of variables and a plurality of identical operators from the formula;
    replacing the sub-formula with a third character string indicating a result of an operation of the sub-formula; and
    outputting the formula with the sub-formula that is replaced with the third character string.

5. A computer-readable, non-transitory medium storing a computer program for converting a formula in a source code to a human language sentence, wherein the computer program causes a computer to execute:
    extracting a first variable included in a formula from the source code described in extensible business reporting language (XBRL), the formula having at least two variables which are divided into a left side and a right side by an operator;
    assigning a predetermined operator to any variables in the formula not provided with a specific operator:
    searching the source code for a first XBRL element that defines the first variable;
    identifying a first label name corresponding to the XBRL element by searching a table that defines label names for XBRL elements, respectively;
    extracting a second variable included in the formula but in a different side of the formula from the first variable;
    searching the source code for a second XBRL element that defines the second variable;
    identifying a second label name corresponding to the second XBRL element by searching the table;
    extracting the operator included in the formula from the source code; and
    replacing the operator with a character string indicating a function of the operator, wherein the character string, the first label name, and the second label name create a human language sentence.

6. The computer-readable, non-transitory medium according to claim 5, wherein the computer program further causes the computer to execute:
    extracting, from the source code, a second character string corresponding to a context element associated with at least one of the first and second variables,
    replacing the at least one of the first and second variables with the second character string to which the label name corresponding to the at least one of the first and second variables is attached; and
    outputting the formula with the at least one of the first and second variables that is replaced with the second character string to which the label name corresponding to the at least one of the first and second variables is attached.

7. The computer-readable, non-transitory medium according to claim 6, wherein the computer program further causes the computer to execute:
    outputting the formula with the operator that is replaced with the character string.

8. The computer-readable, non-transitory medium according to claim 6, wherein the computer program further causes the computer to execute:
    extracting a sub-formula including a plurality of variables and a plurality of identical operators from the formula;
    replacing the sub-formula with a third character string indicating a result of an operation of the sub-formula; and
    outputting the formula with the sub-formula that is replaced with the third character string.

9. An apparatus that converts a formula in a source code to a human language sentence, the apparatus comprising:
    a central processing unit;
    a variable extracting unit that extracts a first variable included in a formula from the source code described in extensible business reporting language (XBRL), the formula having at least two variables which are divided into a left side and a right side by an operator;
    a detecting unit assigning a predetermined operator to any variables in the formula not provided with a specific operator;
    an element searching unit that searches the source code for a first XBRL element that defines the first variable;
    a label identifying unit that identifies a first label name corresponding to the XBRL element by searching a table that defines label names for XBRL elements, respectively;
    wherein a variable extracting unit extracts a second variable included in the formula but in a different side of the formula from the first variable;
    the element searching unit searches the source code for a second XBRL element that defines the second variable; and
    the label identifying unit identifies a second label name corresponding to the second XBRL element by searching the table;
    the apparatus further comprising;
    an operator extracting unit that extracts the operator included in the formula from the source code; and
    an operator replacing unit that replaces the operator with a character string indicating a function of the operator, wherein the character string, the first label name, and the second label name create a human language sentence.

10. The apparatus according to claim 9, further comprising:
    a context-element extracting unit that extracts, from the source code, a second character string corresponding to a context element associated with at least one of the first and second variables,
    a variable replacing unit that replaces the at least one of the first and second variables, with the second character string to which the label name corresponding to the at least one of the first and second variables is attached; and
    a variable output unit that outputs the formula with the at least one of the first and second variables, that is replaced with the second character string to which the label name corresponding to the at least one of the first and second variables is attached.

11. The apparatus according to claim 10, further comprising
    an operator output unit that outputs the formula with the operator that is replaced with the character string.

12. The apparatus according to claim 10, further comprising:
    a sub-formula extracting unit that extracts a sub-formula including a plurality of variables and a plurality of identical operators from the formula;
    a sub-formula replacing unit that replaces the sub-formula with a third character string indicating a result of an operation of the sub-formula; and
    a sub-formula output unit that outputs the formula with the sub-formula that is replaced with the third character string.

* * * * *